United States Patent
Bezar et al.

(10) Patent No.: US 7,814,052 B2
(45) Date of Patent: Oct. 12, 2010

(54) IMPLEMENTING FORMULAS FOR CUSTOM FIELDS IN AN ON-DEMAND DATABASE

(75) Inventors: Eric Bezar, Oakland, CA (US); Doug Chasman, Pittsford, NY (US); Dean Jacobs, Berkeley, CA (US); Simon Wong, San Carlos, CA (US)

(73) Assignee: salesforce.com, inc., San Francisco, CA (US)

( * ) Notice: Subject to any disclaimer, the term of this patent is extended or adjusted under 35 U.S.C. 154(b) by 187 days.

(21) Appl. No.: 11/592,539

(22) Filed: Nov. 3, 2006

(65) Prior Publication Data
US 2008/0126333 A1 May 29, 2008

(51) Int. Cl.
*G06F 7/00* (2006.01)
*G06F 17/00* (2006.01)

(52) U.S. Cl. .................. 707/610; 707/954; 707/713

(58) Field of Classification Search .............. 707/3, 707/10, 4, 2, 1, 103 R, 102, 200, 101, 610, 707/713, 758, 954, 957, 960, 962; 717/106; 709/223, 248
See application file for complete search history.

(56) References Cited

U.S. PATENT DOCUMENTS

| | | | | |
|---|---|---|---|---|
| 5,634,009 A * | 5/1997 | Iddon et al. | ................. | 709/223 |
| 5,835,904 A * | 11/1998 | Vicik et al. | ..................... | 707/1 |
| 6,003,022 A * | 12/1999 | Eberhard et al. | ............... | 707/2 |
| 6,081,801 A * | 6/2000 | Cochrane et al. | ............... | 707/3 |
| 6,088,524 A * | 7/2000 | Levy et al. | ..................... | 707/3 |
| 6,212,514 B1 * | 4/2001 | Eberhard et al. | .................... | 1/1 |
| 6,442,543 B1 * | 8/2002 | Snodgrass et al. | ............. | 707/3 |
| 6,609,123 B1 * | 8/2003 | Cazemier et al. | ............... | 707/4 |
| 6,651,070 B1 * | 11/2003 | Hirashima et al. | .......... | 707/102 |
| 6,763,352 B2 * | 7/2004 | Cochrane et al. | .................... | 1/1 |
| 7,096,259 B1 * | 8/2006 | Gray et al. | .................. | 709/223 |
| 7,213,020 B1 * | 5/2007 | Pal | ............................. | 707/703 |
| 2002/0199024 A1 * | 12/2002 | Givoly et al. | ............... | 709/248 |
| 2003/0187850 A1 * | 10/2003 | Reed et al. | ..................... | 707/10 |
| 2003/0233632 A1 * | 12/2003 | Aigen et al. | ................. | 717/106 |
| 2004/0024790 A1 * | 2/2004 | Everett | ....................... | 707/200 |
| 2004/0220908 A1 * | 11/2004 | Finlay et al. | .................... | 707/3 |
| 2005/0021517 A1 * | 1/2005 | Marchisio | ...................... | 707/4 |
| 2005/0182758 A1 * | 8/2005 | Seitz et al. | ..................... | 707/3 |
| 2005/0223022 A1 * | 10/2005 | Weissman et al. | ........... | 707/102 |
| 2005/0228823 A1 * | 10/2005 | Cotner et al. | ........... | 707/103 R |
| 2006/0212465 A1 * | 9/2006 | Fish et al. | .................... | 707/101 |
| 2007/0073655 A1 * | 3/2007 | Chen et al. | ..................... | 707/3 |

* cited by examiner

*Primary Examiner*—Jean B. Fleurantin
*Assistant Examiner*—Giovanna Colan
(74) *Attorney, Agent, or Firm*—Townsend and Townsend and Crew LLP; David B. Raczkowski

(57) ABSTRACT

The efficiency and versatility for the implementation of formulas in an on-demand database is improved. Formulas are categorized. Based at least partly on the categorization, formulas are evaluated synchronously or asynchronously. An asynchronous evaluation may be performed if a certain set of criteria is not satisfied. Asynchronous evaluations may be performed using a queue. During an asynchronous update of an object, a counter field and/or an estimate field may be used respectively for indicating the consistency of values of the object and a time when the values were consistent. The versatility of formulas is enhanced by using a formula to create a default value for a custom field when it is created and to determine whether an action is to be performed, and is enhanced by having an action define when a formula is to be updated.

35 Claims, 8 Drawing Sheets

FIG. 3

| Custom entity id | org id | val 0 | val 1 | val 2 | val 3 | ... | Val N |
|---|---|---|---|---|---|---|---|
| ao1....1 | ood 1 | A0 | A1 | A2 | A3 | | AN= A0-A3 |
| ao1....2 | ... | B0 | B1 | B2 | B3 | | BN= B0-B3 |
| ao1....3 | ... | C0 | C1 | C2 | C3 | | "CN"= "C1"+"C2"="C1C2" |
| ao2....1 | ... | D0 | D1 | D2 | D3 | | DN= D0-D3+2DN |
| ao2....2 | ... | E0 | E1 | E2 | E3 | | EN= E0-E3 |
| ao2....3 | ... | F0 | F1 | F2 | F3 | | FN= F0-F3 |
| ao3....1 | ood 2 | G0 | G1 | G2 | G3 | | GN= A2+B2+C2 |
| ao3....2 | ... | H0 | H1 | H2 | H3 | | HN= A3+D0/G2 |
| ao3....3 | ... | I0 | I1 | I2 | I3 | | IF (I0>0) return True else return False |

300, 301, 302, 303, 305, 310, 311, 312, 313, 314, 317, 319, 360 org #1, org #2

IMPLEMENTING FORMULAS FOR CUSTOM FIELDS IN AN ON-DEMAND DATABASE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to implementing formulas in database systems, and more particularly to implementing formulas for custom fields in an on-demand database.

BACKGROUND

In modern database systems, users may be able to define a formula that specifies how to compute a new field from other fields. For example, a discount price formula field might be computed from a base price field and a discount percent field. Traditionally, this approach has worked well with conventional databases, in which formulas can be efficiently evaluated since most relevant data is relatively concentrated and because the sizes of the databases are relatively small.

However, as database systems become larger and store many objects, the data stored in the database may become quite dispersed. Thus, the implementation of formulas in a large database can demand much more computing resources to retrieve such dispersed data. Also, formulas may be unnecessarily evaluated or evaluated in an untimely fashion, leading to inefficiency and waste of computing resources. In database systems in which one or more customers may share the various elements of hardware and software of the database system, these problems become compounded as individuals' demand on the system may cause further dispersion or fractionalization of data distribution throughout the database.

Therefore, it is desirable to provide methods and systems for efficient and versatile implementation of formulas in databases.

BRIEF SUMMARY

In embodiments, systems and methods for implementing formulas for custom fields in an on-demand database are provided. These systems and methods can determine a way to evaluate a formula of a given type from among different ways to evaluate different types of formulas. The ability to determine a way for evaluating a formula can enable embodiments to provide more efficient formula evaluations when used in conjunction with one or more of on-demand database services, large databases and multi-tenant database architectures.

Embodiments can employ one or more techniques such as for example and without limitation: classifying formulas based on criteria and evaluating the formulas synchronously or asynchronously based on the classifications, asynchronously evaluating formulas using a queue, providing default value formulas for custom fields, executing an action only after a validation formula has returned the desired result, and/or evaluating a formula only right after a specific action occurs. Employing one or more of these techniques can enable embodiments to efficiently implement formulas and manipulate data in a multi-tenant environment.

A database can generally be viewed as a collection of objects, such as a set of logical tables, containing data fitted into predefined categories. A "table" is one representation of a data object, and is used herein to simplify the conceptual description of objects and custom objects according to the present invention. It should be understood that "table" and "object" may be used interchangeably herein. As used herein, the term on-demand database refers to a web-enabled application that allows one or more users to access one or more databases as a service either via the Internet or some other remote communications mechanism. As used herein, the term multi-tenant database system refers to a database system implementing a multi-tenant architecture that enables customer organizations (i.e., tenants) to share applications and data, and database resources, in one logical database. In multi-tenant database environments, even the database tables themselves can be shared across the tenants. For example, each entity in the data model could contain an organization_id column that distinguishes rows for each tenant. Queries and data manipulation in the context of a tenant filter on this (indexed) organization_id column to ensure proper security and the appearance of virtual private databases. This strategy enables multi-tenant database embodiments to be able to expose standard entities such as for example and without limitation, Account, Contact, Lead, and Opportunity entities to customers.

As used herein, a formula may be comprised of one or more expressions, each giving a result such as a value or condition, which are combined to give a result. The term synchronous is used herein to signify that a formula is evaluated when one or more input values to the formula are changed. The term asynchronous is used herein to signify that a formula is evaluated by a scheduling module after one or more input values of the formula have been changed. The term update refers to a subsequent evaluation of a formula that had been previously evaluated.

According to an embodiment and by way of example, systems and methods can determine from among different ways to evaluate different types of formulas a way to evaluate a formula of a given type. For example, once a formula is defined and is used to obtain a first result, a change in the input data of the formula is received. A determination may be made as to whether the formula accesses input data from only one row of a database table or input data from at least two rows of one or more database tables. If the formula accesses data from only one row, the one-row formula may be synchronously evaluated to obtain a second result. If the formula accesses data from at least two rows, a decision may be made whether to evaluate the multiple-row formula synchronously or asynchronously to obtain a second result. In various aspects, these decisions may be based on an amount of input data to the formula, a current performance load on the database system, and/or the number of synchronous evaluations previously done for a user or tenant. Embodiments may also synchronously evaluate the multiple-row formula when the second result is computable with a delta value.

According to another embodiment, systems and methods for updating a formula in a database system are provided. For example, after a user requests an update of a formula, a query including a set of one or more criteria is submitted to the database. The criteria are analyzed to determine whether the criteria are satisfied. If the criteria are satisfied, the formula is updated synchronously. If the criteria are not satisfied, the formula is updated asynchronously. An asynchronous update may comprise adding the update request as a first item to a queue, evaluating formulas associated with one or more other items previously added to the queue, and subsequently evaluating the first item to obtain the first result. Further, embodiments may perform other actions such as without limitation, blocking additional update requests for the formula until the first item is evaluated, storing the first result in the database at a specific record of a custom field, and indicating an inconsistency between backing data of the first formula and a custom field value.

In an embodiment, an indication of an inconsistency is provided. A counter field of an object having a custom field associated with the formula is provided. The counter field is incremented when requests to update the formula are added to the queue and decremented when the formula is evaluated for an item in the queue. The indication of an inconsistency may be achieved using with a staleness flag, shading, icons, or a link to more status information. The indication may be displayed for an object if any custom field value of that object has an inconsistency.

According to another embodiment, systems and methods estimate a time when custom field values of an object in a database were consistent with other data in the database. A formula receives an input from a portion of the other data and produces a result used for the custom field value. Typically, a request to update a custom field value of the object is received and added as a first item to a queue as part of an asynchronous update of the formula. A first time associated with the first item is stored. Additional items associated with the object may be added to the queue, where a time is associated with each item. The formula of the first item is evaluated as part of a de-queuing process, and the first time is copied into the estimate field. In an embodiment where an object has a counter field, when the counter field is zero prior to adding the first item to the queue, the first time may be copied to the estimate field when the first item is added to the queue.

According to another embodiment, systems and methods for displaying a new custom field in a database are provided. For example, a request to create a custom field having one or more custom field values is received; one or more default formulas may be evaluated to obtain one or more results. The custom field values may be populated with the results and the custom field values may be displayed.

According to another embodiment, systems and methods of processing a request for a field of a database are provided. For example, a request for an action, such as a save, associated with the field is received. A formula associated with the field is evaluated to obtain a Boolean result. If the Boolean result is a first value, the requested action is performed. If the Boolean result is a second value, the requested action is not performed. In one embodiment, each of the expression of the formula must be valid for the first value to be returned. In another embodiment, the first value is returned even though not all of the expressions are valid. A formula may be associated with a specific database record or a plurality of records. Also, if the Boolean result is the second value, an error message may be displayed.

According to another embodiment, systems and methods of storing a custom field value in a database are provided. For example, an action is received as part of a workflow process. Based on the receipt of the action, a formula is updated to obtain the custom field value. Subsequent updates of the formula may be prevented when input values for the formula change.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

Various embodiments in accordance with the present invention will be described with reference to the drawings, in which:

FIG. 3 illustrates an example of objects represented as a table that has custom fields defined with formulas and that may benefit from one embodiment;

DETAILED DESCRIPTION

Embodiments in accordance with the present invention provide systems and methods for implementing formulas in a multi-tenant database network environment. Embodiments describe a family of techniques for implementing formulas that may occur, for example, in the application layer that sits in front of a conventional database. To ensure efficient use of resources, embodiments may reduce the consistency guarantees of data resulting from formulas and return formula field values that are out-of-date. This is particularly true for formulas that have input data from multiple rows, which is more likely to occur in a MTS.

Embodiments can provide an on-demand database that allows users to define a formula that specifies how to compute a new field from other fields. For example, a discount price formula field might be computed from a base price field and a discount percent field. In on-demand applications, the database is shared by many customers and efficiency becomes more important. The application should not use demand computational resources for a single customer to the detriment of other customers. By contrast, single tenant databases are usually able to evaluate formulas efficiently, since most relevant data is relatively concentrated and because the sizes of the databases are relatively small.

Because a multi-tenant database system (MTS) can be quite large with many objects belonging to a single tenant or organization, and data may be quite dispersed, implementation of formulas in an MTS can demand a greater number of computing resources to retrieve such dispersed data. Techniques for effectively implementing formula evaluation in multi-tenant and on-demand databases will next be described with reference to example embodiments.

I. A Multi-Tenant Database System (MTS)

Figure 1:
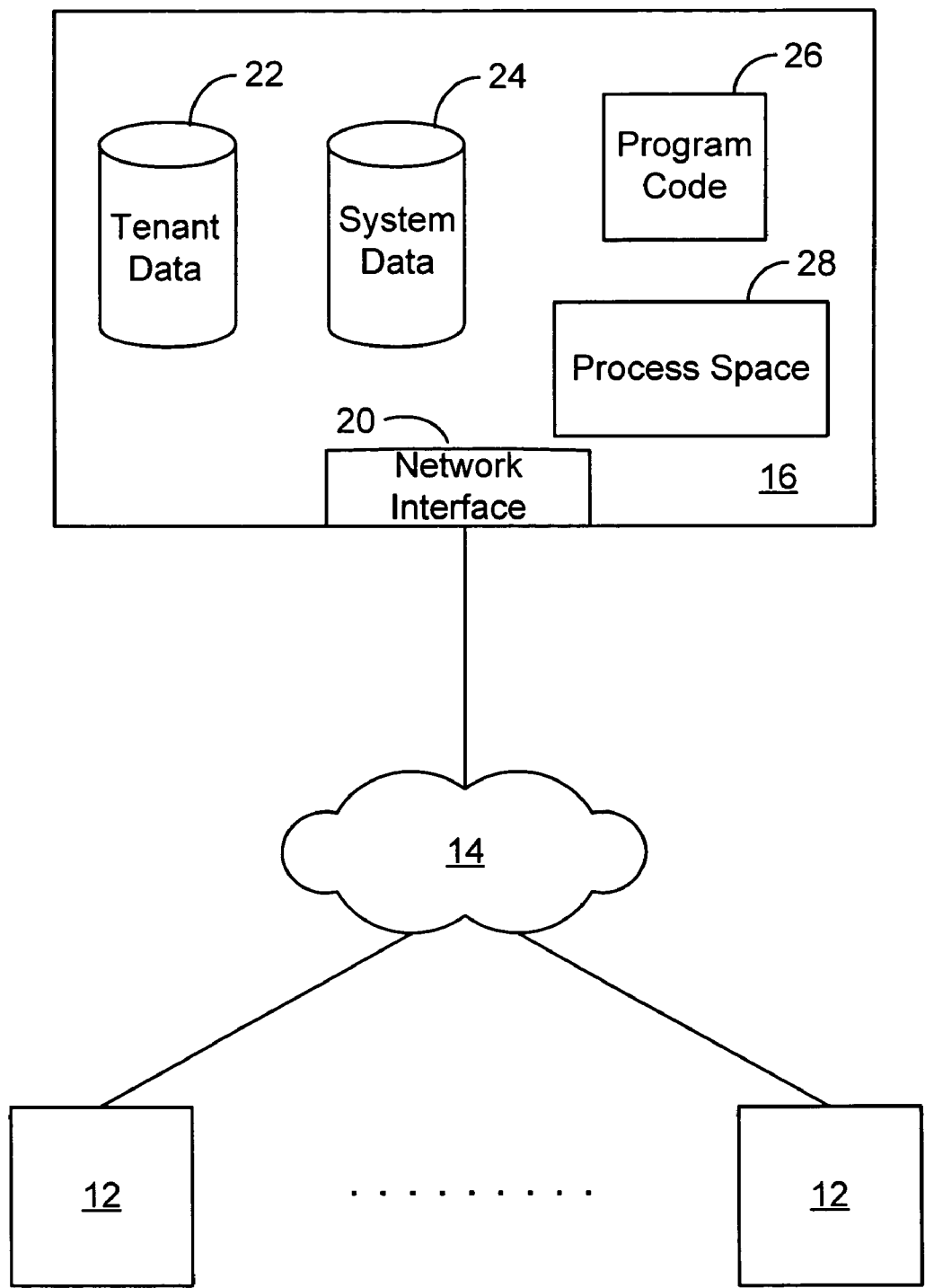
FIG. 1 illustrates an environment wherein a multi-tenant database system might be used.

FIG. 1 illustrates an environment wherein a multi-tenant database system might be used. As illustrated in FIG. 1 (and in more detail in FIG. 2) any user systems 12 might interact via a network 14 with a multi-tenant database system (MTS) 16. The users of those user systems 12 might be users in differing capacities and the capacity of a particular user system 12 might be entirely determined by the current user. For example, where a salesperson is using a particular user system 12 to interact with MTS 16, that user system has the capacities allotted to that salesperson. However, while an administrator is using that user system to interact with MTS 16, that user system has the capacities allotted to that administrator.

Network 14 can be a LAN (local area network), WAN (wide area network), wireless network, point-to-point network, star network, token ring network, hub network, or other configuration. As the most common type of network in current use is a TCP/IP (Transfer Control Protocol and Internet Protocol) network such as the global internetwork of networks often referred to as the "Internet" with a capital "I," that will be used in many of the examples herein, but it should be understood that the networks that the present invention might use are not so limited, although TCP/IP is the currently preferred protocol.

User systems 12 might communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such HTTP server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least as for the users that are accessing that server.

In certain aspects, the system shown in FIG. 1 implements a web-based customer relationship management (CRM) system. For example, in one aspect, MTS 16 can include application servers configured to implement and execute CRM software applications as well as provide related data, code, forms, web pages and other information to and from user systems 12 and to store to, and retrieve from, a database system related data, objects and web page content. With a multi-tenant system, tenant data is preferably arranged so that data of one tenant is kept separate from that of other tenants so that one tenant does not have access to another's data, unless such data is expressly shared.

One arrangement for elements of MTS 16 is shown in FIG. 1, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process and view information and pages available to it from MTS 16 over network 14. Each user system 12 also typically includes one or more user interface devices, such as a keyboard, a mouse, touch screen, pen or the like, for interacting with a graphical user interface (GUI) provided by the browser on a display (e.g., monitor screen, LCD display, etc.) in conjunction with pages, forms and other information provided by MTS 16 or other systems or servers. As discussed above, the present invention is suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium processor or the like. Similarly, MTS 16 (and additional instances of MTS's, where more than one is present) and all of their components might be operator configurable using application(s) including computer code run using a central processing unit such as an Intel Pentium processor or the like, or multiple processor units. Computer code for operating and configuring MTS 16 to intercommunicate and to process web pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, any other scripting language, such as VBScript and many other programming languages as are well known.

According to one embodiment, each MTS 16 is configured to provide web pages, forms, data and media content to user systems 12 to support the access by user systems 12 as tenants of MTS 16. As such, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., RDBMS) as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 2:
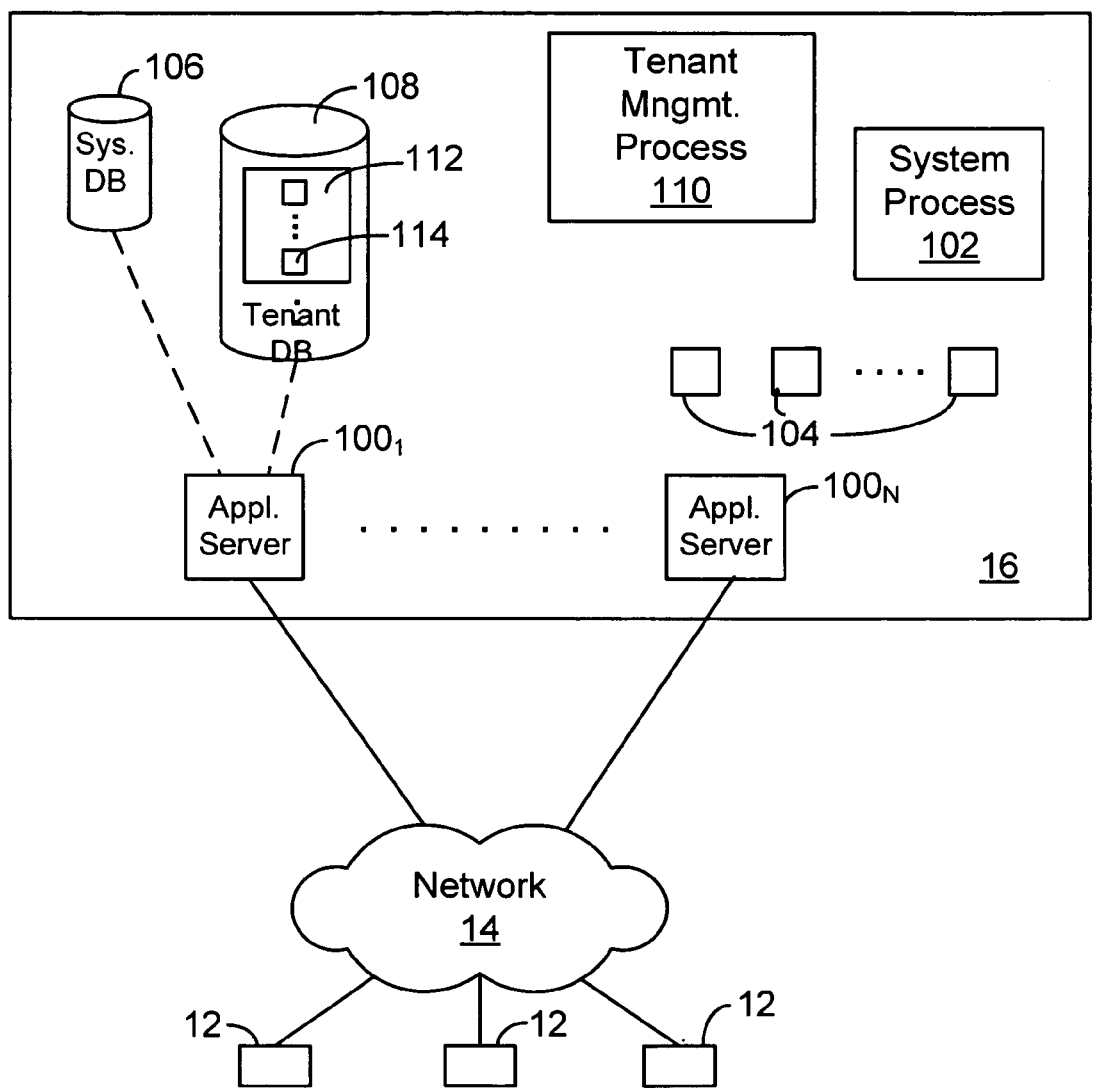
FIG. 2 illustrates elements of FIG. 1 and various interconnections between the elements.

FIG. 2 illustrates elements of MTS 16 and various interconnections in more detail. In this example, the network interface is implemented as one or more HTTP application servers 100. Also shown is system process space 102 including individual tenant process spaces 104, a system database 106, tenant database(s) 108 and a tenant management process space 110. Tenant database 108 might be divided into individual tenant storage areas 112, which can be either a physical arrangement or a logical arrangement. Within each tenant storage area 112, user storage 114 might similarly be allocated for each user.

It should also be understood that each application server 100 may be communicably coupled to database systems, e.g., system database 106 and tenant database(s) 108, via a different network connection. For example, one server $100_1$ might be coupled via the Internet 14, another server $100_{N-1}$ might be coupled via a direct network link, and another server $100_N$ might be coupled by yet a different network connection. Transfer Control Protocol and Internet Protocol (TCP/IP) are preferred protocols for communicating between servers 100 and the database system, however, it will be apparent to one skilled in the art that other transport protocols may be used to optimize the system depending on the network interconnect used.

In certain aspects, each application server 100 is configured to handle requests for any user/organization. Because it is desirable to be able to add and remove application servers from the server pool at any time for any reason, there is preferably no server affinity for a user and/or organization to a specific application server 100. In one embodiment, therefore, an interface system (not shown) implementing a load balancing function (e.g., an F5 Big-IP load balancer) is communicably coupled between the servers 100 and the user systems 12 to distribute requests to the servers 100. In one aspect, the load balancer uses a least connections algorithm to route user requests to the servers 100. Other examples of load balancing algorithms, such as round robin and observed response time, also can be used. For example, in certain aspects, three consecutive requests from the same user could hit three different servers, and three requests from different users could hit the same server. In this manner, MTS 16 is multi-tenant, wherein MTS 16 handles storage of different objects and data across disparate users and organizations.

As an example of storage, one tenant might be a company that employs a sales force where each salesperson uses MTS 16 to manage their sales process. Thus, a user might maintain contact data, leads data, customer follow-up data, performance data, goals and progress data, etc., all applicable to that user's personal sales process (e.g., in tenant database 108). In the preferred MTS arrangement, since all of this data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's sales data might be separate from other users' sales data regardless of the employers of each user, some data might be organization-wide data shared or accessible by a plurality of users or all of the sales force for a given organization that is a tenant. Thus, there might be some data structures managed by MTS 16 that are allocated at the tenant level while other data structures might be managed at the user level. Because an MTS might support multiple tenants including possible competitors, the MTS should have security protocols that keep data, applications and application use separate. Also, because many tenants will opt for access to an MTS rather than maintain their own system, redundancy, up-time and backup are more critical functions and need to be implemented in the MTS.

In addition to user-specific data and tenant-specific data, MTS 16 might also maintain system level data usable by multiple tenants or other data. Such system level data might include industry reports, news, postings, and the like that are sharable among tenants.

In certain aspects, client systems 12 communicate with application servers 100 to request and update system-level and tenant-level data from MTS 16 that may require one or more queries to database system 106 and/or database system 108. MTS 16 (e.g., an application server 100 in MTS 16) generates automatically one or more SQL statements (the SQL query) designed to access the desired information.

II. A Customizable MTS

FIG. 3 illustrates an example of objects represented as a table 300, which contains one or more data categories logically arranged as columns or fields 303 in a viewable schema. Users can define data schemas and create, read, update, and delete objects within those schemas. Table 300 contains an organization ID ("org id") column 301 to distinguish tenant rows. Each row or record 305 of table 300 contains an instance of data for each category defined by fields 303. For example, a CRM database may include a table that describes a customer with fields for basic contact information such as name, address, phone number, fax number, etc, which might be included as standard categories. Another standard entity table may include other standard categories. In an embodiment where table 300 is a standard entity, one or more fields, such as columns 303, could be standard fields According to one embodiment, an additional set of one or more columns, e.g., 10, 100, or 250 columns, of text data are defined in the physical schema. These additional columns, also referred to herein as custom data columns, custom field columns or custom fields, allow a system administrator to define additional fields that are not included in the pre-defined standard fields for that entity. In one aspect, a custom field is stored out of row in a different table from table 300, although such a field may be stored in table 300, e.g. in column 310.

According to another embodiment, table 300 may be a custom entity object, which may have no standard fields. In this case, table 300 may include multiple custom tables, such as entity 360. In this case, table 300 contains a primary key (e.g., "custom entity id" 301) that identifies those rows throughout the database. These custom entities may extend a base application or integrate with other systems, and may be created to specifically cater to, and to facilitate data storage and retrieval for, that organization's particular business model. Thus, table 300 may contain multiple logical tables per organization. A row in these custom entities may be linked to another row of the custom entity table or of a standard entity table. For example, an asset object can be a child custom object of an account object.

Custom fields and custom entities are described in further detail in a published U.S. patent application Ser. No. 2005/10223022, entitled "CUSTOM ENTITIES AND FIELDS IN A MULTI-TENANT DATABASE SYSTEM," which is incorporated in its entirety by reference herein for all purposes.

III. Formulas in a Customizable MTS

In an embodiment, users can define data schemas and create, read, update, and delete objects within those schemas, including custom fields. In this context, a formula is an extension of the schema, which, for example, may specify how to compute a new custom field from other fields. Formulas are expressions that take certain values as input and produce at least one result. Formulas may include arithmetic expressions, but may also include, for example, textual, conditional, or other logical expressions. An example of a textual expression is the concatenating of two strings, such as in formula 313. A single formula may include one type of expression or many types of expressions.

According to different embodiments, formulas may be used for many different purposes. Formulas may receive many different types of inputs and may provide many different types of results. For example, formulas may produce Boolean, date, date/time, duration, text, or hyperlink results. In some embodiments, the result of the formula may be used as the value placed as an entry in a specific row of a field or used to determine an action.

A. Formulas for Calculating Custom Fields

In one embodiment, a customizable field is created such that its value is based on the values within other fields. A formula may be used to define the value of a particular field or column, and the input data to the formula may come from other columns. For example, formulas may be used to compute a discount price from a base price and a discount percent, to compute the sum of purchases, or to compute a net profit based on retail cost and wholesale cost. A formula may also return a "null" value. This may be necessary should organizations have need for enforcing a "null" value in a field, based on the value of another field. For example, to enforce "Do Not Call" registries, an organization may need to null out the standard Phone field on the contact record. Formulas in column 310 show some examples of different formulas.

In one aspect, a formula may only use input data from fields within the same row. For example, formula 311 only accesses data within the first row. Evaluation of formula 311 uses data A0 and A3 as inputs to obtain the result AN, which is used as the value for the custom field. Such formulas are termed one-row formulas. It is noteworthy that in an embodiment, the formula need not exist in the same row as the data that it accesses. For instance, the formula BN=A0+A1 could be automatically updated synchronously. The same formula may be used for other column entries, but using the corresponding data from that particular row, such as formula 312.

In an embodiment, formulas may also access data from more than one row. For example, formula 317 accesses data from each of the first 3 rows, i.e. A2, B2, and C2. Such formulas are termed multiple-row formulas. Multiple-row formulas typically occur as a summary field that aggregates or averages the values of a specific column. However, multiple-row formulas may have input data from different fields including a field from a child custom object. For example, a formula field of a parent object may access rows of one of its children and a formula in a row of a custom entity may access data in a row of another custom entity.

In an embodiment, a formula may also use as input the current entry value for which the result of the formula is used, i.e. the formula may have input from the same field being updated. For example, if a currency field "Amount" needs to be updated to a new value *using a mathematical formula, all currency fields on the record should be available for determining the new value, including the "Amount" field itself (i.e., Amount=Amount*2), as in formula 314. When a formula is used to update an entry, i.e., the value of a specific row (record) and field (column), the formula may be termed a custom formula field.

In an embodiment, a formula may be evaluated in response to different actions. For example, a formula may be evaluated based on the creation of a record, a change to input data, or based on an action in a workflow that occurs at a specific time.

In an embodiment, a formula that is used to determine default values for a field when a new record is created is termed a default formula. A purpose of a default formula is to enhance user productivity by reducing the number of fields a user needs to fill in manually. Typically, global values, such as those for an organization or custom entity, are used as the input, but values specific to a certain record may also be used. A default value could be Null. A default formula is executed after the field is created, e.g. by clicking a "New" button, and before the edit page is displayed. Thus, editable fields on the page are populated with values before presenting the page to the user. The values may then be stored in the database. Default value formulas use the same formula expression language as custom formula fields. However, default value formulas are only calculated once at the very first time the record is initialized. The user can override the calculated default value if they choose. In one embodiment, if the user blanks out the calculated default value, there is no way to get the value back. In other embodiments, a user may be able to re-create the value.

In an embodiment, a workflow field formula allows organizations to update the value of a field as a result of a workflow rule, condition, or trigger. For example, when a specific condition is approved, the formula is then stored in a custom field at its current value. It is not updated if the fields that are used in the formula change. An example is the price of an order, which should not change after the order has been placed. The condition may be an external input such as entered by a user, or based on a certain value of an entry stored within the database. A single condition may act as a trigger to update multiple fields. In some embodiments, the amount of fields updatable by a single rule is capped at a maximum amount.

B. Validation Formulas

In another embodiment, formulas are used as part of a decision scheme, where the result is whether an action is performed or not. For example, in one aspect, a formula is used to determine whether to return True (Valid) or False (Error), such as in an if-then statement. The Boolean result then may determine whether a requested action is performed on a field, file, or other object. Such formulas are termed validation formulas. Other Boolean values may also be used.

In one aspect, the formula is composed of multiple expressions, each of which has a specified value (e.g. equals) or range of values (e.g. greater than) for a true value to be returned. In another aspect, a certain percentage or combination of expressions have a specified value or range of values for a true value to be returned. Conversely, a formula may use the results of expressions to determine if a false value is to be returned. The formula expression language for validation formulas generally follows the same rules as custom formula fields. Formula 319 shows an example of a validation formula. Note that the true or false result is not used as the formula field value, but is used to determine whether the action is performed.

In one aspect, a validation formula is executed when the action is requested, but before the action is actually performed. If the validation formula returns a False (Error) or improper value, a use-specified error message may be displayed. In one aspect, the error message may be displayed next to a standard or custom field. Thus, field-specific validation logic can stop or abort the requested action from occurring and/or display an error message if appropriate. In another aspect, an error message may be displayed at the top of the page for validation logic that is not specific to any one field. An administrator may specify the error message to be displayed, as well as where to display the error message as part of the validation definition process. If the formula returns True (Valid), the requested action may be allowed to continue normally. In one embodiment, a validation formula is used to determine whether a save request is to be performed or completed and/or to display an error message regarding the save request.

A validation formula definition may include a name and a status indicator. A validation name is similar to a custom object name or field name. An active (Status) indicator, e.g. a checkbox, specifies whether the validation formula is active or inactive. Only active validation formulas are executed when the action is requested. Validation formulas may be active by default. A description of the validation formula may be used for documentation purposes. Error messages can be stored in such a way that they are available in a manner similar to field labels.

A validation formula is able to reference any merge field on the current entity, just like a custom formula field. In one aspect, validation formulas are not associated with a specific record type. In this case, validation formulas can use a merge field in the formula expression to implement record type-specific functionality. Other embodiments have subtype-specific validation formulas. In one embodiment, if the field associated with the formula is hidden or read-only, the validation is still performed, but any errors are displayed at the top of the page, instead of highlighting the field.

III. Evaluating Formulas in a Customizable MTS

In an MTS where a large amount of data from many different tenants may be stored in a plurality of different ways, computational resources may be constrained. For this reason, it may be beneficial for different types of formulas to be treated differently. Thus, embodiments identify formulas whose computational requirements are different and respond by utilizing an appropriate amount of resources, which may be dependent on many factors.

Figure 4:
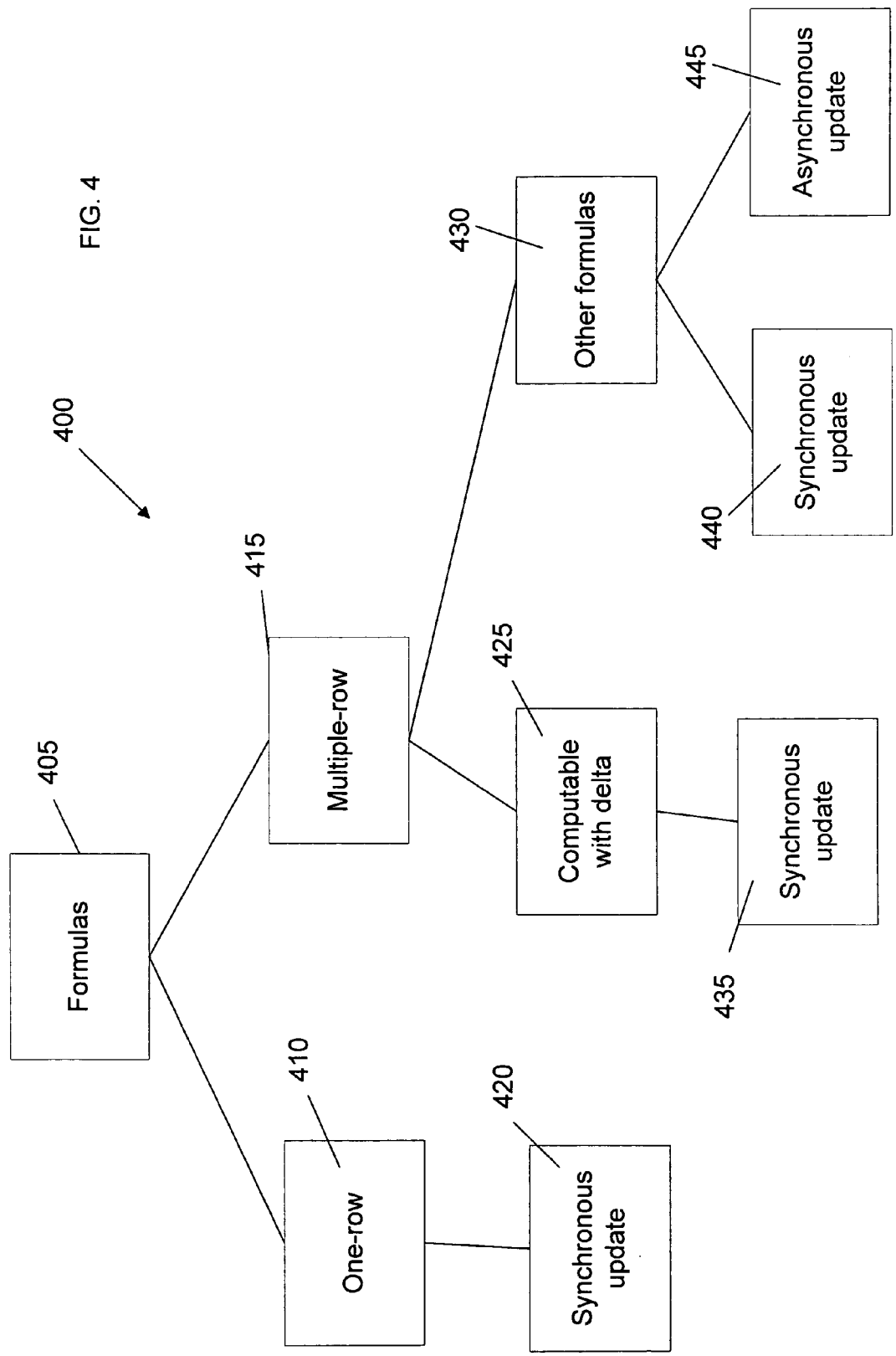
FIG. 4 illustrates a classification of formulas according to one embodiment.

FIG. 4 shows a set of categories 400 that are used for formula evaluation according to one embodiment. The categories 400 may apply to all of the formulas mentioned above. Formulas 405 may initially be separated into two types.

The first type of formula is a one-row formula 410 that accesses data in only one row as described above. These formulas are short-running and are evaluated with a synchronous update 420. For example, evaluation of a simple arithmetic expression over fields in the same record are short-running. The synchronous evaluation ensures that the field values are always up to date.

Another type of formula is a multiple-row formula 415, which accesses data in more than one row as described above. Formulas 415 are potentially long running. Multiple-row formulas 415 may be further broken down into delta formulas 425 that are updatable by a delta value and complex formulas 430 that are not updatable with a delta value. Delta formulas 425 are evaluated with a synchronous update 435. Complex formulas 430 may be evaluated synchronously or asynchronously depending on certain factors.

Figure 5:
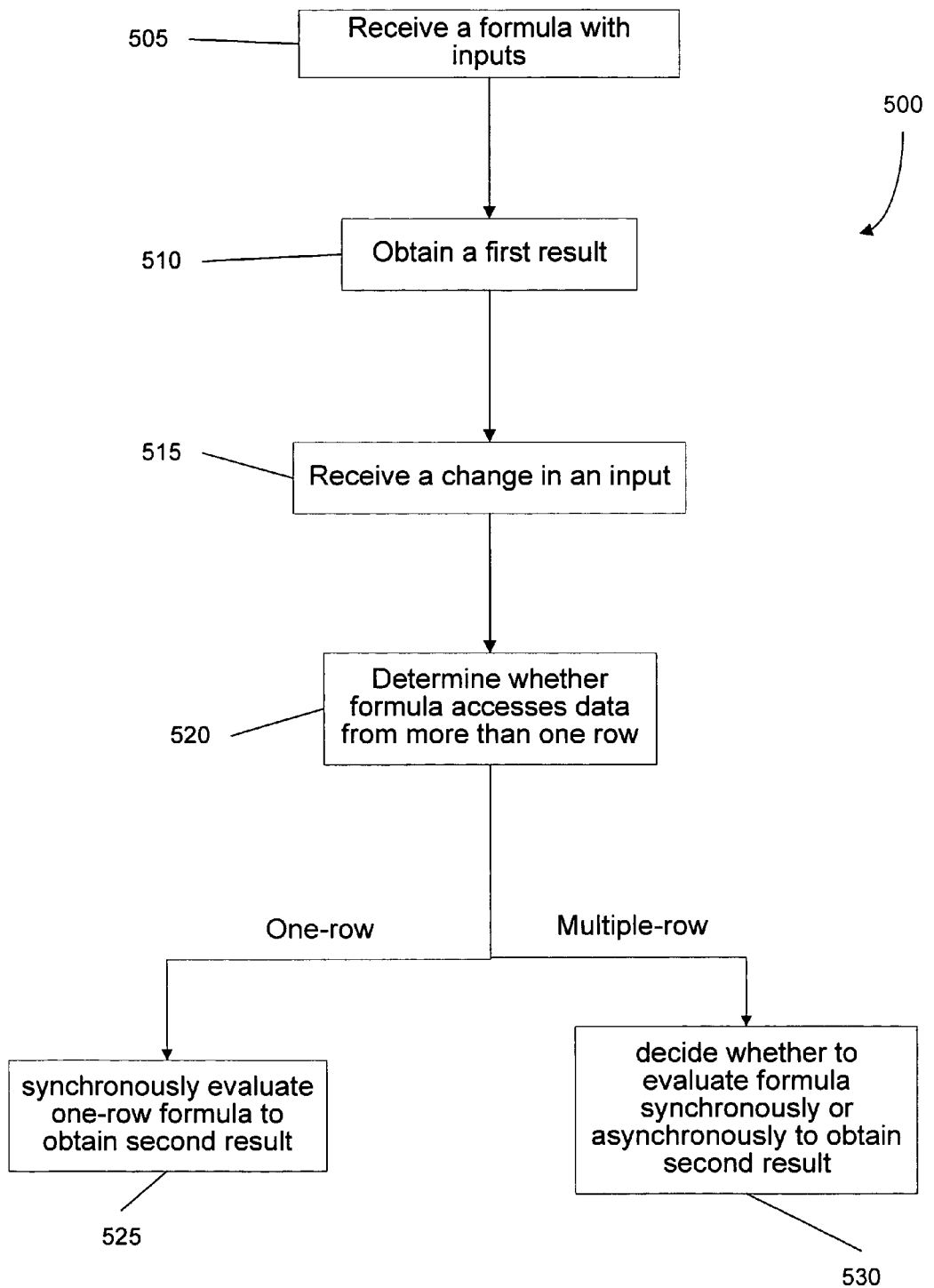
FIG. 5 illustrates a flowchart for a method of evaluating a formula in a database according to one embodiment.

FIG. 5 illustrates a method 500 for evaluating formulas in a database system according to one embodiment. In block (505), a formula is defined. Part of the definition includes which data the formula accesses. In one aspect, the formula uses the data as input to obtain a first result. In block (510), a first result is obtained from a first evaluation of the formula. In block (515), a change in at least one input of the formula is received.

In block (520), a determination is made as to whether the formula accesses data from more than one row of a single database table. In one aspect, an analysis of the properties of the input data of the formula is made at this point in order to make the determination. In another aspect, the determination is made by retrieving stored information regarding the properties of the input data. The stored information may be obtained from a previous analysis or from data entered by a user. In embodiments, this may be achieved with a flag or data byte indicating the kind of formula.

In block (525), if the formula accesses data from only one row, the one-row formula is synchronously evaluated to obtain a second result. In block (530), if the formula accesses data from more than one row, a decision is made as to whether to evaluate the multiple-row formula synchronously or asynchronously to obtain the second result.

A. Short-Running Formulas

In one aspect, the one-row formulas are evaluated on-the-fly at the point the formula is referenced, e.g. when a custom field is viewed. Such formulas may be referenced in two contexts, and may be compiled down into separate forms for each context.

The first context is the "point-wise" context, such as the edit/detail page for a single object. In this case, formula evaluation may occur in the application to reduce the load on the database. In one aspect, a stack machine-based set of commands that can be executed by the application are created.

The second context is the "bulk" context, such as a list view for a set of objects satisfying certain conditions. In this case, formula evaluation may occur in the database so the list can be efficiently sorted and managed along the formula field. In one aspect, a query fragment for evaluating the formulas is generated and merged into queries for the objects. The generated query fragment may define additional fields that contain the values of formulas. The semantics of the formulas should be carefully chosen so that the same result can be obtained in both contexts.

In one aspect, the decision of whether to evaluate the formula in "bulk" is decided based on functionality. Effectively, this means that once someone wants to view multiple rows of a field, where each field depends only on fields within the same row, then the calculation is done in bulk. For example, reports that consolidate information across many accounts are typically done in bulk. In one aspect, reports can integrate data from sales, marketing, and service. In another aspect, reports access standard account and contact information such as new, active, and neglected accounts, contact roles, partner accounts, and account teams. In yet another aspect, reports also organize data by date, team, product, type, status, and many other criteria.

Error handling within a bulk evaluation can be problematic. If a formula produces an error, such as divide-by-zero, for some elements of the backing data, then the entire query could fail. In one aspect, the elements causing the problem are identified and flagged; and results for the remaining elements are returned. In another aspect, to guard against errors in the generated query fragment, the value may be forced to NULL; and an additional field describing which elements had errors is defined. For example, the formula "1/x" would produce a query fragment equivalent to "if x<>0 then 1/x else NULL" together with an additional field defined by the fragment "x<>0".

B. Multiple-Row Formulas Computable With Delta

In one embodiment, a result from a multiple-row formula is stored in the database. Subsequent references of these formulas simply retrieve the value from the database. In one aspect, updating of the value resulting from a formula occurs only if the backing (input) data has changed. Thus, database resources are not wasted doing needless work, as would be the case if formula values were updated at regular intervals.

One type of multiple-row formula is a "delta" formula. A "delta" is the difference between the old value and the new value. Delta formulas are formulas that can be computed as a delta added to or subtracted from the stored value. For example, consider a formula field on a parent object that takes the sum (of a field) across all its children objects. The update of a child can be processed by computing the new value minus the old value and adding it to the stored value of the sum.

In one embodiment, formulas in this group are evaluated synchronously at the point the backing data is changed. The delta is computed from the change and merged into the stored value in the database. This ensures that the results are always up to date. As these formulas are also updated synchronously, they may be short-running.

C. Evaluating Potentially Long-Running Multiple-Row Formulas

Other types of multiple-row formulas are more complex and are potentially long-running. In one embodiment, the categorization of these formulas is done dynamically, and thus it may not be known whether a formula is short or long running. In this case, the implementation technique performs its first actions at the point the backing data is changed. Techniques used in evaluating these formulas include determining whether to evaluate them synchronously or asynchronously, determining how the asynchronous evaluation of the formulas is done, and tracking a time when a field defined by a formula was last correct.

Figure 6:
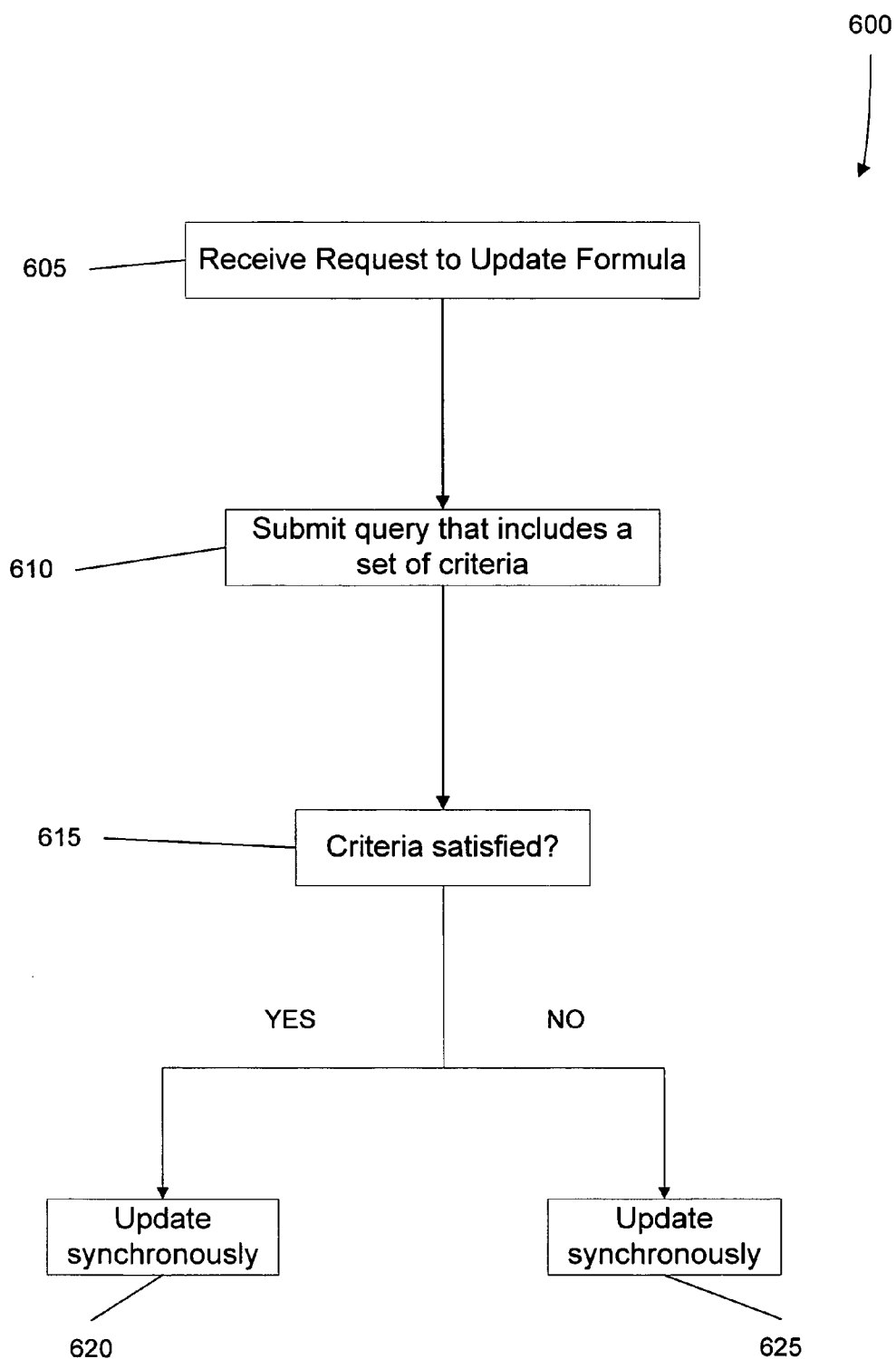
FIG. 6 illustrates a flowchart for a method of updating a formula in a database according to one embodiment.

FIG. 6 illustrates a method 600 for updating a formula in a database according to an embodiment. In block (605), a request to update a formula is received. In one aspect, the request is created automatically after backing data has changed. In another aspect, the request is initiated directly by a user.

In block (610), a query is submitted that includes a set of criteria. The set may include one criterion or multiple criteria. In block (615), the criteria is analyzed to determine whether it is satisfied. In block (620), if the criteria are satisfied, the formula is updated synchronously. In block (625), if the criteria are not satisfied, the formula is updated asynchronously.

The set of criteria may be one criterion or may be multiple criteria. The criteria may be based on many different properties, e.g. inputs of the formula, attributes of a user, or the database usage. If multiple criteria are used, the criteria may be satisfied based on any expression using the criteria. For example, in one aspect all of the criteria may be required to be satisfied, or in other aspects only some of the criteria or certain combinations of the criteria may be required to be satisfied. One skilled in the art will recognize the many different types of combinations of criteria that may be used.

In one embodiment, the set of criteria includes a test of how much backing data the formula has. If the formula is backed by a small amount of data, the formula will be updated synchronously. In one aspect, the formula is evaluated in a query with a limit on the number of backing data elements. If this query succeeds, the result may be stored in the database at the point the backing data is changed. This ensures that the results are always up to date. In another embodiment, the placement of the backing data is considered. For example, if the backing data comes from only two rows then the evaluation may be synchronous, whereas if the backing data is more disperse then the evaluation may be asynchronous.

In other embodiments, the current performance load of the database is used. For instance, if resources that are allocated for other purposes have been deemed to have a higher priority, then an update of a formula may be done asynchronously. Thus, the current load on the database system may be assessed. Other criteria include a number of synchronous evaluations per user or tenant, which in one aspect could cause an asynchronous evaluation if a maximum was reached. Each of the criteria may be combined, or used individually, in the determination of whether to asynchronously evaluate a formula. For example, the exact number of backing data along with its positions may be weighed against the current usage of resources.

Figure 7:
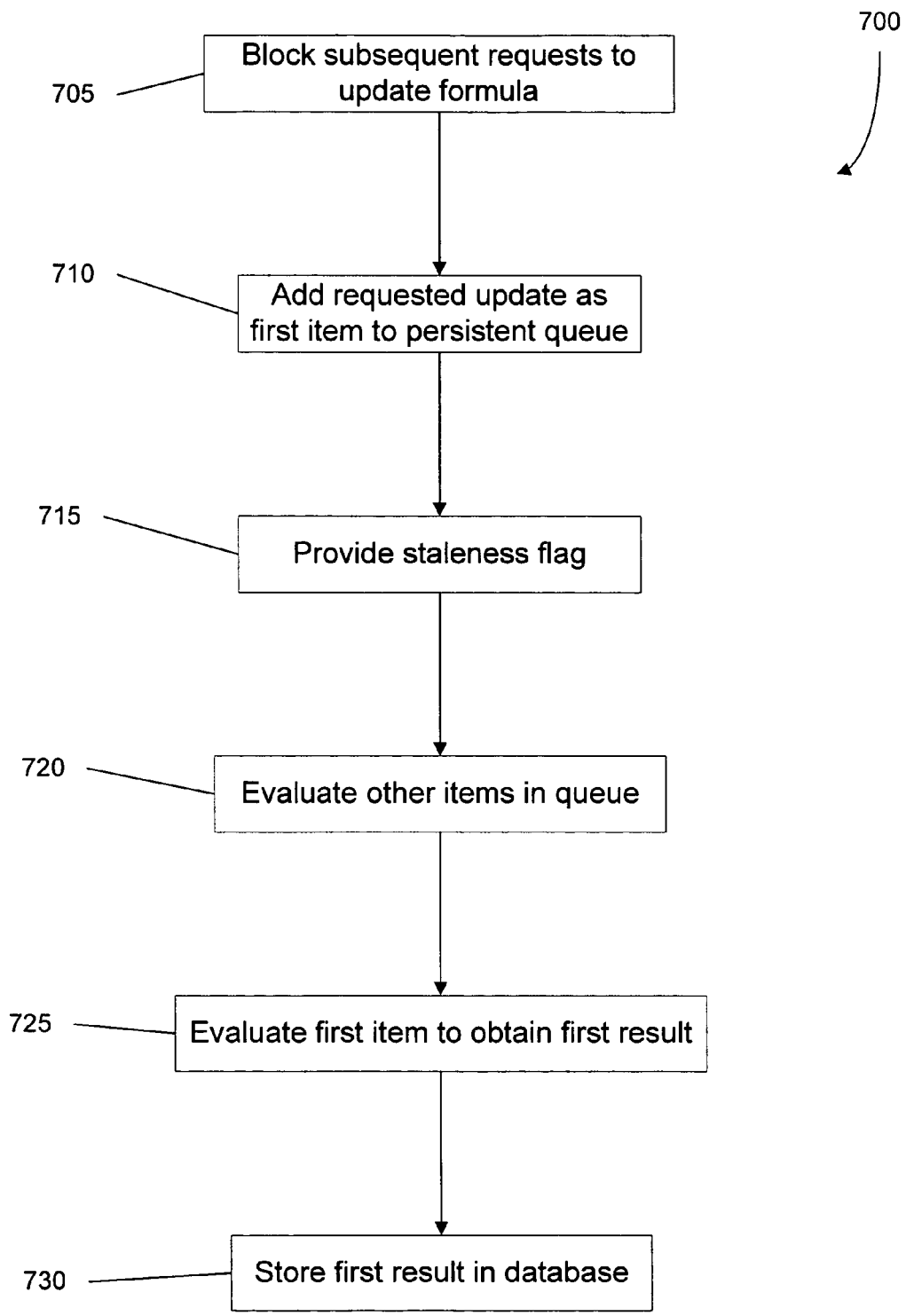
FIG. 7 illustrates a flowchart for a method of asynchronously updating a formula in a database according to one embodiment.

FIG. 7 illustrates a method 700 for updating a formula asynchronously according to an embodiment. In one aspect, method 700 is used to accomplish the asynchronous update in block (625). In optional block (705), the rate at which requests for an update can fail and waste resources is controlled. To this end, in one aspect, a window of historical information is kept in memory for the application. If an attempt for a synchronous update fails, subsequent attempts to update a formula for the same object and field are blocked for some period of time. This historical information need not be highly-available or highly-accurate since it is not needed for correctness.

In block (710), if an attempt at a synchronous update fails, thus causing an asynchronous update, the requested update of a formula is added as an item to a persistent queue. In one aspect, this item can record the fact that a given field on a given object must be recomputed.

In an asynchronous update, the stored value of a formula field may be temporarily inconsistent with the backing data, and thus stale. In one embodiment, an indication of staleness is provided, such as in block (715). In one aspect, a user-visible flag indicates that the fields of an object are stale. Also, a rough estimate of the last time the values of a field were fresh may be provided. For efficiency, the granularity of this information may be at the level of the entire object rather than individual fields, but flags for individual fields and even records within a field may be used if granularity is desired.

In one embodiment, a staleness indicator is computed by using a counter field for an object, field, or entry within a field. The counter field keeps a count of the number of items in the queue for that object. In one aspect, the counter field may be hidden. This counter field is incremented when an item is added to the queue at the point the backing data is changed and is decremented when an item is removed from the queue at the point the value of the field is recomputed. The staleness indicator is computed by checking whether this count field is greater than zero. In one aspect, the staleness indicator is an on-screen flag. Other embodiments may have other staleness indicators, including icons, shading, and links to status info.

In block (720), other items that had been previously added in the queue are evaluated. In one aspect, a set of batch servers asynchronously dequeue these items. In block (725), the formula for the item added in block (710) is evaluated. Thus, where the formula provides the values of a field, one or more of these values are recomputed. In block (730), the result is stored in the database.

Figure 8:
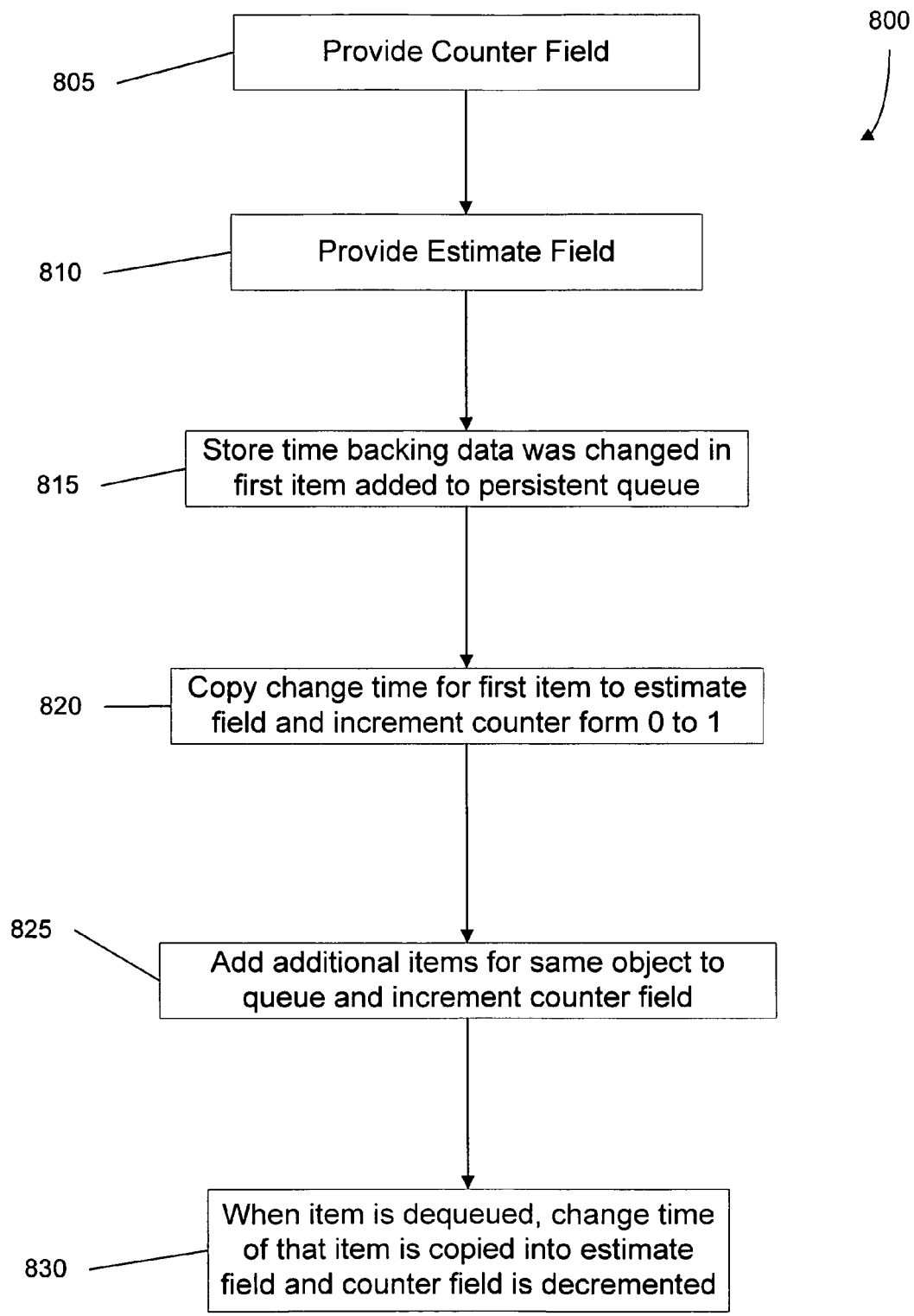
FIG. 8 illustrates a flowchart for a method of determining a time when a database field was last correct according to one embodiment.

FIG. 8 illustrates a method 800 for computing the staleness indicator and an estimate of the last time the fields of an object were fresh during an asynchronous update of formulas for the fields according to one embodiment. In block (805), a counter field that counts the number of items of an object or field in a queue is provided. In block (810), an estimate field is provided. In one aspect, the counter and/or estimate fields are hidden. In block (815), a change time at which the backing data of a formula changed and an indication that the field needs to be updated is associated with a first queue item. In one aspect, the change time and indication of a need for an update are stored in the first queue item.

In block (820), when the first item belonging to an object is added to the queue, the change time is copied into the estimate field of the object and the counter field is incremented from 0 to 1. In one aspect, the items in the queue are ordered by update time, and the queue items are processed in order by batch servers. In block (825), additional items for the same object, or field, are added to the queue and the counter field is incremented; however, the change time is not copied to the estimate time for these additional items. In block (830), at the point an item is de-queued and processed, the change time for that item is copied into the estimate field on the object and the counter field is decremented.

Note that this estimate is actually off by one change. That is, after an item is processed, the object is current up to the time of the next change in the queue. For example, after the first item is processed, the estimate field already has the change time of the first item as its value, and thus the value does not change when the first item is de-queued and evaluated. However, this inaccuracy is safe in that it makes the estimate field values look worse than they are. It considerably improves efficiency because there is no need to scan through the items of the queue. No special processing is needed when the last item is de-queued because the count field indicates that the object is not stale.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of evaluating a formula in a database system, the method comprising:
    receiving, at the database system, a formula defined to access data stored in one or more rows of a database table of the database system, wherein the formula is an expression that receives the accessed data as input and provides a result that is different than the input data;
    evaluating, with the database system, the formula to obtain a first result based on first values of the input data stored in the one or more rows of the database table;
    receiving, at the database system, a change in a first value of at least one of the input data stored in the one or more rows;
    obtaining, with the database system, an updated result of the formula by:
    determining whether the formula accesses input data from only one row of a the database table; and
    synchronously evaluating the formula to obtain the updated result when the formula accesses input data from only one row of the database table; and otherwise
    deciding whether to evaluate the formula synchronously or asynchronously to obtain the updated result when the formula accesses input data from at least two rows of the database table, wherein the formula accesses input data from multiple rows of the database table, further comprising synchronously evaluating the multiple-row formula to obtain the updated result when the updated result of the multiple-row formula is computable with a delta value combined with the first result of the multiple-row formula.

2. The method of claim 1, wherein determining whether the formula accesses input data from only one row of a database table comprises:
    retrieving data representing one or more properties of the input data.

3. The method of claim 1, further comprising storing the first result in the database system.

4. The method of claim 1, wherein synchronously evaluating the formula to obtain the updated result includes:
    computing the one-row formula point-wise.

5. The method of claim 1, wherein synchronously evaluating the formula to obtain the updated result includes:
    computing the one-row formula in bulk.

6. The method of claim 1, wherein deciding whether to evaluate the formula synchronously or asynchronously to obtain the updated result includes:
    deciding based on an amount of input data to the formula whether to evaluate the formula synchronously or asynchronously to obtain the updated result.

7. The method of claim 1, wherein deciding whether to evaluate the formula synchronously or asynchronously to obtain the updated result includes:
    deciding based on a current performance load on the database system whether to evaluate the formula synchronously or asynchronously to obtain the updated result.

8. The method of claim 1, wherein deciding whether to evaluate the formula synchronously or asynchronously to obtain the updated result includes:
    deciding based on a number of synchronous evaluations previously done for a specific user or tenant whether to evaluate the formula synchronously or asynchronously to obtain the updated result.

9. The method of claim 1, wherein the result of the formula is provided as the value for a custom field of a table in the database system.

10. The method of claim 1, wherein the formula determines whether a requested action is to be performed.

11. The method of claim 1, wherein at least one of the first result and updated result is a set of textual characters.

12. A computer readable medium storing program code for controlling a processor to perform an operation for evaluating a formula in the database system, the program code comprising code for:
    receiving a formula defined to access data stored in one or more rows of a database table of the database system, wherein the formula is an expression that receives the accessed data as input and provides a result that is different than the input data;
    evaluating the formula to obtain a first result based on first values of the input data stored in the one or more rows of the database table;
    receiving a change in a first value of at least one of the input data stored in the one or more rows;
    determining whether the formula accesses input data from only one row of the database table; and
    synchronously evaluating the formula to obtain the updated result when the formula accesses input data from only one row of the database table; and otherwise
    deciding whether to evaluate the formula synchronously or asynchronously to obtain the updated result when the formula accesses input data from at least two rows of the database table, wherein the formula accesses input data from multiple rows of the database table, and wherein the program code further code for synchronously evaluating the multiple-row formula to obtain the second result of the multiple-row formula when the second result is computable with a delta value combined with the first result of the multiple-row formula.

13. The computer readable medium of claim 12, wherein determining whether the formula accesses input data from only one row of a database table comprises:
retrieving data representing one or more properties of the input data.

14. The computer readable medium of claim 12, wherein the program code further code for storing the first result in the database system.

15. The computer readable medium of claim 12, wherein synchronously evaluating the formula to obtain a second result includes:
computing the one-row formula point-wise.

16. The computer readable medium of claim 12, wherein synchronously evaluating the formula to obtain a second result includes:
computing the one-row formula in bulk.

17. The computer readable medium of claim 12, wherein deciding whether to evaluate the formula synchronously or asynchronously to obtain a second result includes:
deciding based on an amount of input data to the formula whether to evaluate the formula synchronously or asynchronously to obtain a second result.

18. The computer readable medium of claim 12, wherein deciding whether to evaluate the formula synchronously or asynchronously to obtain a second result includes:
deciding based on a current performance load on the database system whether to evaluate the formula synchronously or asynchronously to obtain a second result.

19. The computer readable medium of claim 12, wherein deciding whether to evaluate the formula synchronously or asynchronously to obtain a second result includes:
deciding based on a number of synchronous evaluations previously done for a specific user or tenant whether to evaluate the formula synchronously or asynchronously to obtain a second result.

20. The computer readable medium of claim 12, wherein the result of the formula is provided as the value for a custom field of a table in the database system.

21. The computer readable medium of claim 12, wherein the formula determines whether a requested action is to be performed.

22. The computer readable medium of claim 12, wherein at least one of the first and second results is a set of textual characters.

23. A system comprising: a database; at least one processor coupled with the database, the processor configured to:
receive a formula defined to access data stored in one or more rows of a database table of the database system, wherein the formula is an expression that receives the accessed data as input and provides a result that is different than the input data;
evaluate the formula to obtain a first result based on first values of the input data stored in the one or more rows of the database table;
receive a change in a first value of at least one of the input data stored in the one or more rows determine whether the formula accesses input data from only one row of the database table; and
synchronously evaluate the formula to obtain a second result when the formula accesses input data from only one row of the database table; and otherwise
decide whether to evaluate the formula synchronously or asynchronously to obtain a second result when the formula accesses input data from at least two rows o5 the database table, wherein the formula accesses input data from multiple rows of the database table, and wherein the processor is further configured to synchronously evaluate the multiple-row formula to obtain the second result of the multiple-row formula when the second result is computable with a delta value combined with the first result of the multiple-row formula.

24. The system of claim 23, wherein determining whether the formula accesses input data from only one row of a database table comprises:
retrieving data representing one or more properties of the input data.

25. The system of claim 23, wherein the processor is further configured to store the first result in the database system.

26. The system of claim 23, wherein synchronously evaluating the formula to obtain a second result includes:
computing the one-row formula point-wise.

27. The system of claim 23, wherein synchronously evaluating the formula to obtain a second result includes:
computing the one-row formula in bulk.

28. The system of claim 23, wherein deciding whether to evaluate the formula synchronously or asynchronously to obtain a second result includes:
deciding based on an amount of input data to the formula whether to evaluate the formula synchronously or asynchronously to obtain a second result.

29. The system of claim 23, wherein deciding whether to evaluate the formula synchronously or asynchronously to obtain a second result includes:
deciding based on a current performance load on the database system whether to evaluate the formula synchronously or asynchronously to obtain a second result.

30. The system of claim 23, wherein deciding whether to evaluate the formula synchronously or asynchronously to obtain a second result includes:
deciding based on a number of synchronous evaluations previously done for a specific user or tenant whether to evaluate the formula synchronously or asynchronously to obtain a second result.

31. The system of claim 23, wherein the result of the formula is provided as the value for a custom field of a table in the database system.

32. The system of claim 23, wherein the formula determines whether a requested action is to be performed.

33. The system of claim 23, wherein at least one of the first and second results is a set of textual characters.

34. The method of claim 9, further comprising:
prior to obtaining the updated result, receiving, at the database system from a user system, a request for the custom field value; and
providing, with the database system, the updated result of the formula to the user system.

35. The method of claim 1, further comprising:
storing the formula in the database system.

* * * * *